US012508197B2

(12) United States Patent
Hoffman

(10) Patent No.: US 12,508,197 B2
(45) **Date of Patent: *Dec. 30, 2025**

(54) PERSONAL USE EXTRACORPOREAL LOW INTENSITY ACOUSTIC OR SHOCK WAVE MECHANICAL TIP AND METHODS OF USE

(71) Applicant: MOON POOL LLC, Chatsworth, CA (US)

(72) Inventor: Jonathan Hoffman, Studio City, CA (US)

(73) Assignee: MOON POOL LLC, Chatsworth, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 18/460,732

(22) Filed: Sep. 5, 2023

(65) Prior Publication Data

US 2023/0404846 A1 Dec. 21, 2023

Related U.S. Application Data

(63) Continuation of application No. 16/850,878, filed on Apr. 16, 2020, now Pat. No. 11,779,514.

(60) Provisional application No. 62/894,913, filed on Sep. 2, 2019.

(51) Int. Cl.
*A61H 23/00* (2006.01)
*A61H 23/02* (2006.01)

(52) U.S. Cl.
CPC ......... *A61H 23/004* (2013.01); *A61H 23/006* (2013.01); *A61H 23/008* (2013.01); *A61H 23/0254* (2013.01); *A61H 2201/1418* (2013.01); *A61H 2201/1669* (2013.01)

(58) Field of Classification Search
CPC .... A61H 23/00; A61H 23/004; A61H 23/006; A61H 23/008; A61H 23/0254; A61H 23/06; A61H 2023/002; A61H 1/006; A61H 1/008; A61H 2201/0153; A61H 2201/1157; A61H 2201/12–1215; A61H 2201/1418; A61H 2201/1669
USPC ............................................ 601/47, 97, 107
See application file for complete search history.

(56) References Cited

U.S. PATENT DOCUMENTS 5,085,207 A * 2/1992 Fiore ................. A61H 23/0254 601/134
6,217,531 B1 4/2001 Reitmajer
7,390,308 B2 6/2008 Schultheiss
7,470,240 B2 12/2008 Schultheiss et al.
7,497,834 B2 3/2009 Schaden et al.
7,497,835 B2 3/2009 Schultheiss et al.
7,497,836 B2 3/2009 Schultheiss et al.
7,507,213 B2 3/2009 Schultheiss et al.
7,537,572 B2 5/2009 Schultheiss et al.
7,544,171 B2 6/2009 Schaden et al.
7,578,796 B2 8/2009 Schultheiss et al.
(Continued)

FOREIGN PATENT DOCUMENTS

WO 2007087470 A2 8/2007
WO 2007098300 A2 8/2007

*Primary Examiner* — Paige Kathleen Bugg
(74) *Attorney, Agent, or Firm* — SLEMAN & LUND LLP

(57) ABSTRACT

A treatment device includes a housing having a longitudinal axis extending between a proximal end and a distal end, a striking element disposed within the housing and moveable along the longitudinal axis, a tip disposed adjacent the distal end, and a nose cone disposed about at least a portion of the tip, the tip being moveable within the nose cone.

14 Claims, 8 Drawing Sheets

(56) References Cited

U.S. PATENT DOCUMENTS

| | | | | |
|---|---|---|---|---|
| 7,594,930 | B2 | 9/2009 | Warlick et al. | |
| 7,600,343 | B2 | 10/2009 | Schultheiss et al. | |
| 7,601,127 | B2 | 10/2009 | Schultheiss et al. | |
| 7,695,443 | B2 | 4/2010 | Voss | |
| 7,775,995 | B2 | 8/2010 | Voss | |
| 7,841,995 | B2 | 11/2010 | Schultheiss et al. | |
| 7,883,482 | B2 | 2/2011 | Schultheiss et al. | |
| 7,905,845 | B2 | 3/2011 | Schultheiss et al. | |
| 7,988,648 | B2 | 8/2011 | Warlick et al. | |
| 8,162,859 | B2 | 4/2012 | Schultheiss et al. | |
| 8,197,444 | B1 | 6/2012 | Bazargan et al. | |
| 8,257,282 | B2 | 9/2012 | Uebelacker et al. | |
| 8,535,249 | B2 | 9/2013 | Uebelacker et al. | |
| 8,951,216 | B2 * | 2/2015 | Yoo | A61H 23/0254 601/84 |
| 10,716,565 | B2 | 7/2020 | Shelton, IV et al. | |
| 11,779,514 | B2 * | 10/2023 | Hoffman | A61H 23/0254 601/47 |
| 2007/0053795 | A1 | 3/2007 | Laugharn, Jr. et al. | |
| 2007/0239082 | A1 | 10/2007 | Schultheiss et al. | |
| 2008/0183111 | A1 | 7/2008 | Voss | |
| 2008/0191596 | A1 | 8/2008 | King | |
| 2008/0269651 | A1 | 10/2008 | Warlick et al. | |
| 2009/0041864 | A1 | 2/2009 | Warlick | |
| 2009/0088670 | A1 | 4/2009 | Warlick et al. | |
| 2009/0093739 | A1 | 4/2009 | Voss | |
| 2009/0221940 | A1 | 9/2009 | Marlinghaus et al. | |
| 2009/0270915 | A1 * | 10/2009 | Tsai | A61H 1/008 606/238 |
| 2010/0100119 | A1 * | 4/2010 | Herndon | A61H 23/0254 606/201 |
| 2010/0113966 | A1 | 5/2010 | Spruce | |
| 2011/0130714 | A1 | 6/2011 | Wells | |
| 2011/0177576 | A1 | 7/2011 | Schaden et al. | |
| 2013/0231735 | A1 | 9/2013 | Deem et al. | |
| 2014/0114220 | A1 * | 4/2014 | Lee | A61H 23/006 601/107 |
| 2014/0350438 | A1 | 11/2014 | Papirov et al. | |
| 2015/0133950 | A1 | 5/2015 | Shelton et al. | |
| 2016/0022352 | A1 | 1/2016 | Johnson et al. | |
| 2016/0242985 | A1 * | 8/2016 | Fuhr | A61H 1/008 |
| 2017/0296185 | A1 | 10/2017 | Swensgard et al. | |
| 2021/0022951 | A1 * | 1/2021 | Hu | A61H 9/0021 |
| 2021/0113421 | A1 * | 4/2021 | Chuang | A61H 39/04 |
| 2021/0307845 | A1 | 10/2021 | Park et al. | |

* cited by examiner

PERSONAL USE EXTRACORPOREAL LOW INTENSITY ACOUSTIC OR SHOCK WAVE MECHANICAL TIP AND METHODS OF USE

CROSS-REFERENCE TO RELATED APPLICATIONS

The present application is a continuation of U.S. Ser. No. 16/850,878, filed Apr. 16, 2020, which claims the benefit of U.S. Provisional Application Ser. No. 62/894,913, filed Sep. 2, 2019, entitled "PERSONAL USE EXTRACORPOREAL LOW INTENSITY SHOCK WAVE MECHANICAL TIP AND METHODS OF USE," the contents of both of which are hereby incorporated by reference as if fully set forth herein.

FIELD OF THE DISCLOSURE

The disclosure relates to non-invasive home use medical devices. More particularly, the present disclosure relates to non-invasive home use medical devices utilizing low intensity acoustic waves.

BACKGROUND OF THE DISCLOSURE

Acoustic wave treatments and low intensity extracorporeal shock wave treatments are well known in the art and have been widely known and used in the professional medical community for several decades. The treatment methodology has been demonstrated to be effective in treating soft tissue injuries or damage, reducing fatty deposits commonly known as cellulite, and most recently for the treatment of male erectile dysfunction.

SUMMARY OF THE DISCLOSURE

In some examples, a treatment device includes a housing having a longitudinal axis extending between a proximal end and a distal end, a striking element disposed within the housing and moveable along the longitudinal axis, a tip disposed adjacent the distal end, and a nose cone disposed about at least a portion of the tip, the tip being moveable within the nose cone.

In some examples, a treatment device includes a housing having a longitudinal axis extending between a proximal end and a distal end, a first element disposed at the distal end of the housing, a motor disposed within the housing, a second element operatively coupled to and driven by the motor, and an intermediate element disposed between the first element and the second element, the intermediate element being configured to move between the first element and the second element, and to contact at least one of the first element and the second element.

BRIEF DESCRIPTION OF THE DRAWINGS

Various embodiments of the presently disclosed treatment devices are disclosed herein with reference to the drawings, wherein.

Figure 1A:
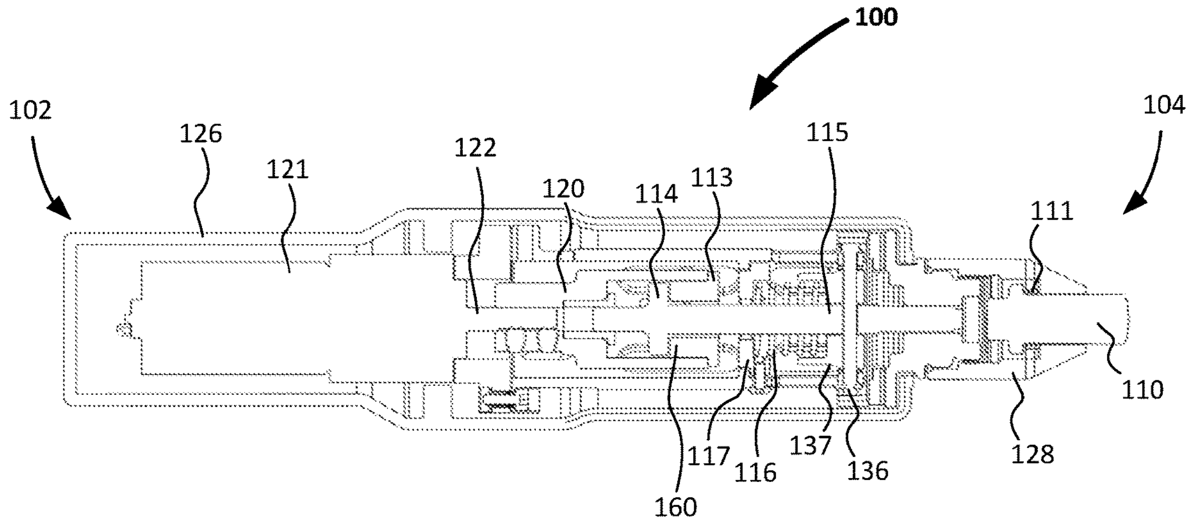
FIG. 1A shows a sectional side view of one embodiment of the disclosure wherein the driveshaft is in contact with the tip.

Various embodiments of the present disclosure will now be described with reference to the appended drawings. It is to be appreciated that these drawings depict only some embodiments of the disclosure and are therefore not to be considered limiting of its scope.

DETAILED DESCRIPTION OF THE DRAWINGS

Despite the various improvements that have been made to acoustic wave treatment devices, conventional devices suffer from some shortcomings.

There therefore is a need for further improvements to the devices, systems, and methods of manufacturing and using acoustic wave treatment devices. Among other advantages, the present disclosure may address one or more of these needs.

As used herein, the term "proximal," when used in connection with a component of a treatment device, refers to the end of the component farthest from the treatment area, whereas the term "distal," when used in connection with a component of a treatment, refers to the end of the component closest to the treatment area.

Likewise, the terms "trailing" and "leading" are to be taken as relative to the operator of the treatment device. "Trailing" is to be understood as relatively closer to the operator, and "leading" is to be understood as relatively farther away from the operator or closer to the target site of treatment.

In conjunction with the included drawings, this detailed description is intended to impart an understanding of the teachings herein and not to define their metes and bounds. One particular implementation, illustrating aspects of the present teaching, is presented in detail below. Some of the many possible variations and versions are also described.

Generally, mechanical, electro-mechanical, electronic, electro-hydraulic and pneumatic mechanisms may be used to generate an acoustic wave from a device used for extracorporeal acoustic wave treatments. Each of them involves the rapid acceleration of a projectile from an initial state of rest to a maximum velocity at which point it strikes a target whereby an inelastic transfer occurs of the kinetic energy in the accelerated projectile to the target. Since the target is captive and physically constrained, it cannot be displaced but instead generates an acoustic wave. This acoustic wave may then be transferred to any elastic medium including human tissue. If the target is the tip of the extracorporeal acoustic wave treatment device, and the tip is placed in contact with human tissue, the acoustic signal is transferred to the human tissue. In this manner, the acoustic signal energy, or shock wave, is transferred to the human tissue of the subject thereby effecting beneficial medical treatment.

Certain devices employ costly, fragile, and complicated means of accelerating the projectile which strikes the target and generates the acoustic wave used in treatment. In one example, an electro-mechanical device is used to accelerate the projectile. This electro-mechanical means of accelerating the projectile is intrinsically inexpensive, simple, and robust thereby enabling an inexpensive yet effective extra-corporeal acoustic wave treatment device to be introduced into the consumer marketplace at a price point affordable by virtually anyone, making much needed treatments much more widely available than they are at present.

In some examples, energy is instantaneously transferred from an external source to the projectile causing the projectile to accelerate rapidly, strike the target, and return to the initial starting position. Conversely, the instant disclosure relates to a device where a projectile is a shaft which moves in a reciprocating motion by means of a helical cam which bears on a transverse cam follower mechanism attached to the shaft. As the shaft is displaced progressively in the direction opposite the target, the shaft compresses a compression spring, thereby storing energy. The helical cam is rotated by an inexpensive DC motor thereby simply, inexpensively, and robustly converting rotational motion into reciprocating motion. Because the helical cam provides for a gradual progressive compression of the spring, it is possible to store a significant amount of energy utilizing a small, inexpensive motor. Once the cam follower reaches the apex or toe of the cam and drops off, the shaft is accelerated rapidly by virtue of the compressed spring rapidly decompressing. By this means, non-linear reciprocating motion is achieved with a simple, inexpensive, robust mechanism.

In some examples, the driveshaft is accelerated at a high velocity towards the tip or target in order to collide and generate the desired acoustic signal. Without being bound by any particular theory, it is believed that the nature of the mechanism dictates that maximum energy transfer occurs if the collision between the shaft and the tip occurs almost immediately upon release of the stored energy of the compression spring decompressing. As a result of this, the shaft may be subject to significant mechanical interference with the tip, assuming the tip is mechanically constrained and unable to move. This interference may create an inefficient energy transfer between shaft and tip/target resulting in an ineffectual acoustic signal and a failure to generate the desired energy signature from which medical benefit is derived. Moreover, this mechanical interference may place unnecessary and potentially damaging stresses on the mechanical components of the device. Additionally, the total travel distance of the shaft may be constrained by the drop-off height of the helical cam-meaning the cam follower freefalls off the cam toe until it strikes the cam heel. At this point any remaining kinetic energy may be transferred to the helical cam rather than to the tip. For these reasons, alternative configurations may utilize an intermediate member or slug to transfer the kinetic energy from the shaft to the tip while eliminating the disadvantageous problems of mechanical interference between shaft and tip.

The disclosed configurations permit a simple, inexpensive, robust, home use solution which permit self-applied low intensity acoustic wave treatment for various parts of the user's body which would be optimal for the application.

Low intensity acoustic or shock wave generation and transfer means embodying the principles of this disclosure solve the problems of a simple, inexpensive, and robust, home use solution which permits self-applied low intensity acoustic or shock wave treatment for various parts of the user's body. The several embodiments of the disclosure employ designs, materials, and manufacturing methods which are inexpensive and consistent with current manufacturing practices. The functionality, size, cost, simplicity, ease of use, reliability and robustness of the proposed configurations are all advantageous.

Implementations following the principles of this disclosure allow the advantageous modality of a simple, inexpensive, and robust home-use solution which permits self-applied low intensity acoustic or shock wave treatment for various parts of the user's body which would be optimal for the application.

FIG. 1A shows a sectional view of one embodiment of treatment device 100. Treatment device 100 extends between a proximal end 102 and a distal end 104, and includes a housing 126 in the shape of a generally elongated cylinder. Housing 126 may be easily and conveniently grasped in the user's hand in such a manner as to advantageously permit the user to accurately place tip 110 on the desired area of the body to apply treatment. The instant configurations allow energy generated within the device to be transferred to an acoustic wave emanating from tip 110.

Driveshaft 115 is accelerated towards tip 110 for purposes of colliding inelastically and transferring its kinetic energy. Specifically, motor 121 having a motor output shaft 122 is rigidly coupled by means of shaft coupler 120 to helical cam 113. Cam follower 114 may be integral with driveshaft 115 and may be forced into intimate contact with the surface of helical cam 113 via compression spring 116. As helical cam 113 is rotated due to the rotation of motor 121, cam follower 114 is drawn rearwards towards motor 121 by virtue of displacement by the ramp profile of helical cam 113, said displacement causing compression spring 116 to compress. Compression spring 116 may be at its proximal end constrained by spring base plate 117 and at its distal end constrained by spring cap 137 which is rigidly affixed to driveshaft 115.

As driveshaft 115 moves progressively rearwards (i.e., translates along the longitudinal axis toward proximal end 102), towards motor 121 by virtue of the ramping action of helical cam 113 displacing cam follower 114, compression spring 116 becomes more and more compressed.

Figure 1B:
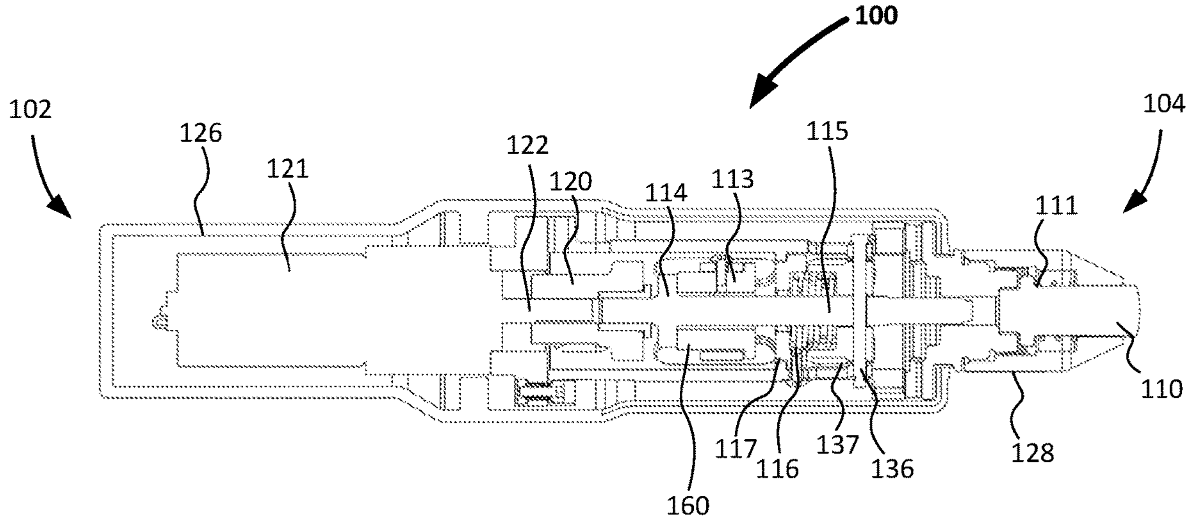
FIG. 1B shows a sectional side view of one embodiment of the disclosure wherein the driveshaft is in the rearmost position, on a toe of a cam.

Referring now to FIG. 1B which is a sectional view of one embodiment of the disclosure, it can be seen that driveshaft 115 is in the rearmost position on the toe 160 of helical cam 113. It is at this precise moment during the rotation of helical cam 113 when driveshaft 115 has reached maximum rearward displacement and compression spring 116 is under maximum compressive load. After further rotation of helical cam 113, cam follower 114 falls off of the toe 160 of helical cam 113 permitting compression spring 116 to rapidly decompress, thereby imparting kinetic energy to driveshaft 115, accelerating it rapidly towards the distal end of the device, and toward tip 110.

In this configuration, kinetic energy of driveshaft 115 is imparted efficiently to tip 110. With many low intensity acoustic or shock wave devices, tip 110 is physically constrained within nose cone 128, inhibiting it from motion along its longitudinal axis. Given that the impact of driveshaft 115 with tip 110 occurs while driveshaft 115 is at maximal acceleration, and therefore still traveling longitudinally after being accelerated by compression spring 116, were it to contact tip 110 and be forced to stop traveling, there m indeed be a transfer of kinetic energy, but much of the energy may be absorbed by nose cone 128 and housing 126 rather than being transferred entirely to tip 110 and thereby to the user's treatment area. In order to avoid such undesirable energy transfer to nose cone 128 and housing 126, tip 110 is disposed at least partially within the nose cone 128 and permitted longitudinal freedom of motion.

Figure 2A:
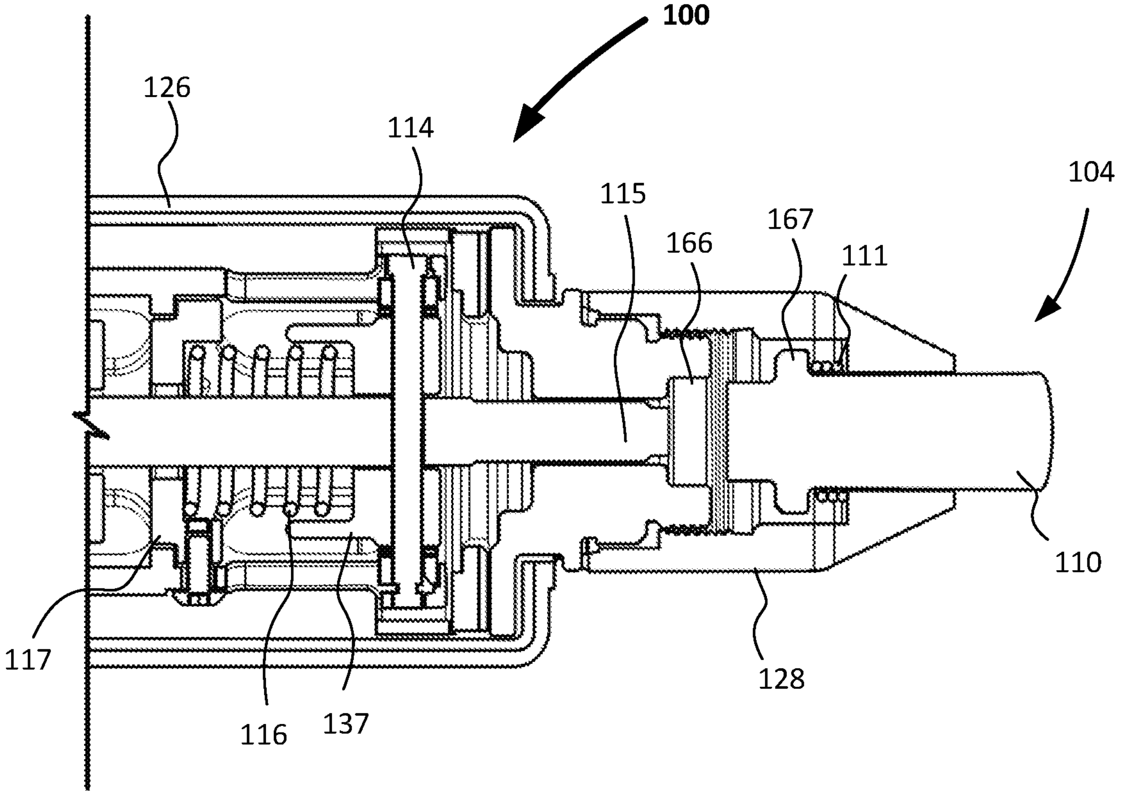
FIG. 2A is a close-up sectional side view of one embodiment of the disclosure illustrating the driveshaft in the forwardmost position and a tip in the forewardmost position.

Referring now to FIG. 2A, which is a close-up sectional view of the tip and nose cone assembly of one embodiment of the disclosure, the arrangement of the major components may be plainly seen and the operation of the device may be readily understood. In this view, driveshaft 115 is in the fully forward position, maximally displaced towards tip 110. Also, in this view, it may be seen that tip 110 is in the fully forward displaced position after having been displaced by contact with driveshaft 115. Also visible is return spring 111 which is a compression spring which bears against nose cone 128 and annular ring 167 integrally formed with tip 110. The purpose of return spring 111 is to permit tip 110 to accelerate and displace forward, yet return tip 110 back to its proximal-most resting position in anticipation of the next collision with driveshaft 115. Return spring 111 may have a predetermined spring constant so as to provide a slight force that is still sufficient to permit the return of tip 110 back to its resting position while countering the force of tip 110's acceleration as little as possible. In this configuration, tip 110 may freely accelerate forward after being struck by the accelerating driveshaft 115 as a result of the impact which occurs when the limit of forward travel of the forwardmost face of driveshaft 115 interferes with the resting rearwardmost face of tip 110 when in the resting or rearwardmost position. In this view, it may be seen that return spring 111 is fully compressed as a result of the forward movement of tip 110, said stored energy in return spring 111 now ready to return tip 110 rearwards back to its resting position, ready for the next impact from driveshaft 115. In this manner, tip 110 is properly positioned for impact with driveshaft 115 each time driveshaft 115 accelerates forward rapidly upon cam follower 114 falling off of cam toe 160, thereby permitting compression spring 116 to decompress and accelerate driveshaft 115.

Figure 2B:
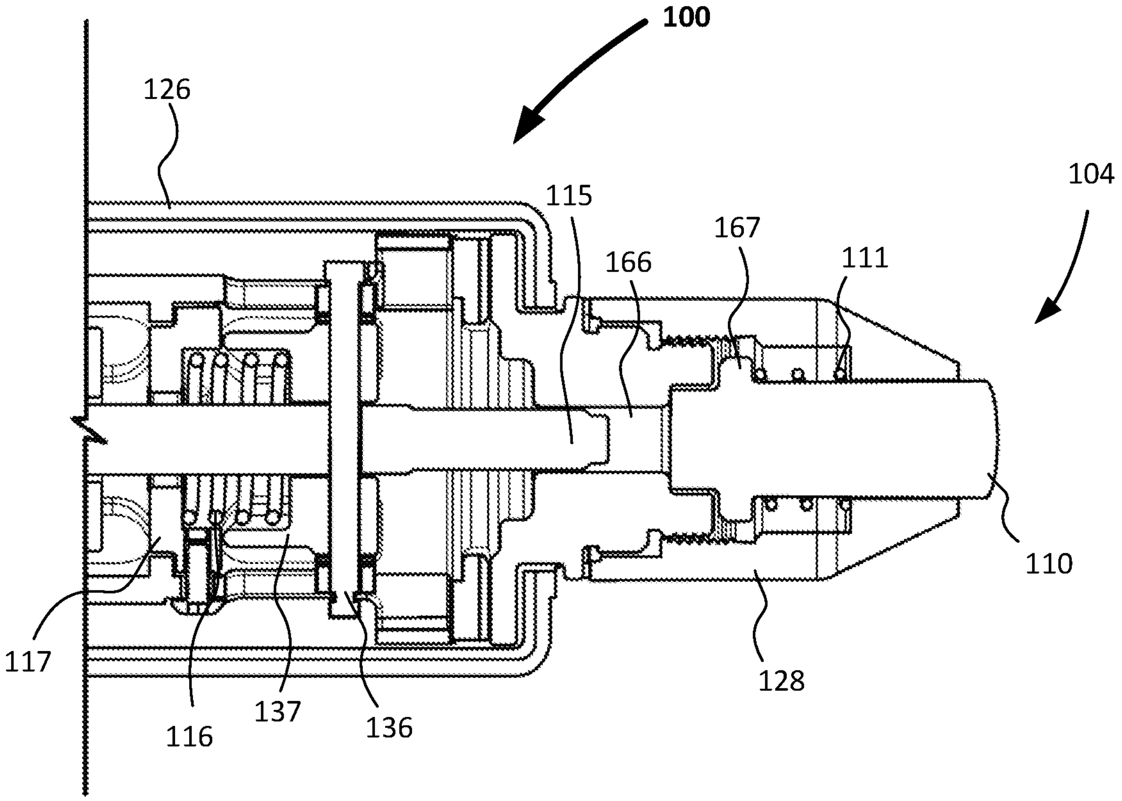
FIG. 2B is a close-up sectional side view of one embodiment of the disclosure illustrating a driveshaft in the rearmost position and a tip in the resting position.

Referring now to FIG. 2B, a close-up sectional view of the tip and nose cone assembly of one embodiment of the disclosure is shown. Driveshaft 115 is in the rearwardmost (i.e., proximal-most) position, tip 110 is in the resting or rearwardmost (i.e., proximal-most) position, and return spring 111 is in its relaxed and uncompressed state. In this view, it may also be seen that compression spring 116 is in its maximally compressed state, with maximum stored energy, ready to be released. In this condition, an air gap 166 is shown between driveshaft 115 and tip 110. Air gap 166 is at its maximum length, permitting ample distance for driveshaft 115 to accelerate due to the decompression of compression spring 116 once cam follower 114 falls off of cam toe 160, thereby releasing the stored energy in compression spring 116. At the moment that driveshaft 115 reaches its maximum acceleration, the forwardmost tip of driveshaft 115 strikes the rearwardmost face of tip 110, causing tip 110 to accelerate forward as a result of the inelastic collision between driveshaft 115 and tip 110. In this manner, the stored energy of compression spring 116 as translated into the acceleration of driveshaft 115, and is transferred to tip 110 to the treatment area of the patient.

This configuration contemplates two elements to create an acoustic wave, namely a striking element (e.g., driveshaft) and a moveable element (e.g., tip). In an alternate embodiment of the disclosure, the transfer of stored energy in compression spring 116 is transferred to tip 110 in other ways using, for example, additional components.

Figure 3A:
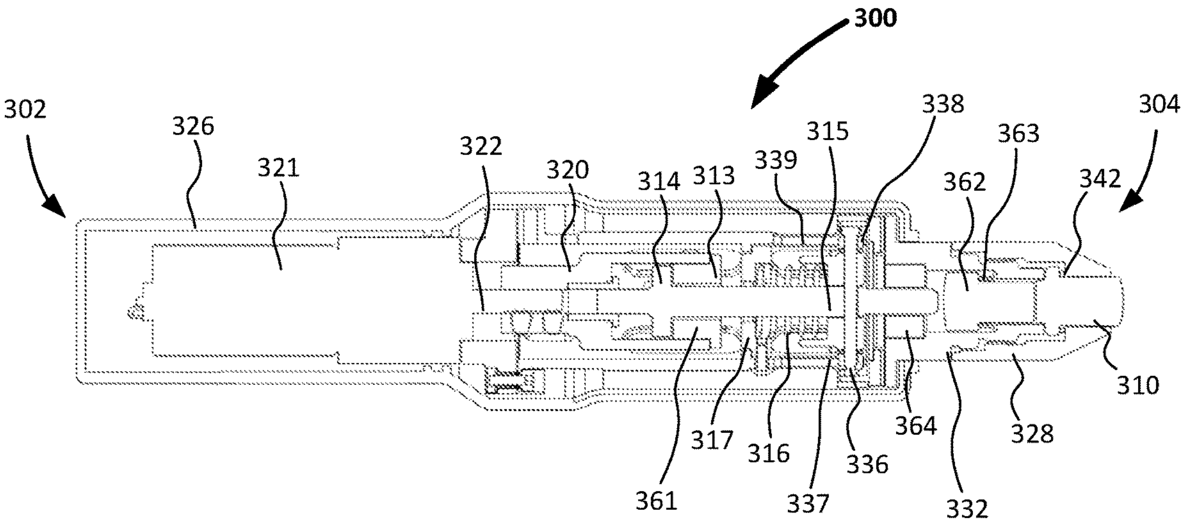
FIG. 3A is a sectional side view of one embodiment of the disclosure incorporating a transfer slug, and a driveshaft in the forwardmost position of travel.

Referring now to FIG. 3A, which is a sectional view of the tip and nose cone assembly of an alternative embodiment of the disclosure, the arrangement of the major components of device 300 may be plainly seen and the operation of the device may be readily understood. In this view, driveshaft 315 is in the fully forward (distalmost) position, on the heel 361 of helical cam 313 maximally displaced toward the proximal end of device 300. Also, in this view, it may be seen that there is an additional intermediate component, transfer slug 362 having a flared end, which resides in the space between the distal end of driveshaft 315 and the proximal end of tip 310. In this view, transfer slug 362 is in the forwardmost position and its distal end is in intimate contact with the rearwardmost face of tip 310. Transfer slug return spring 363 is in the fully compressed condition, ready to release the stored energy and return transfer slug 362 back to its starting or rearwardmost position. In this arrangement, tip 310 is loosely constrained against longitudinal movement, its annular ring 367 trapped between the distal face of transfer housing 332 and proximal face of nose cone 328 with o-rings 342 in the interstitial space permitting tip 310 to vibrate freely as a result of the collision impact and energy transfer of transfer slug 362.

Figure 3B:
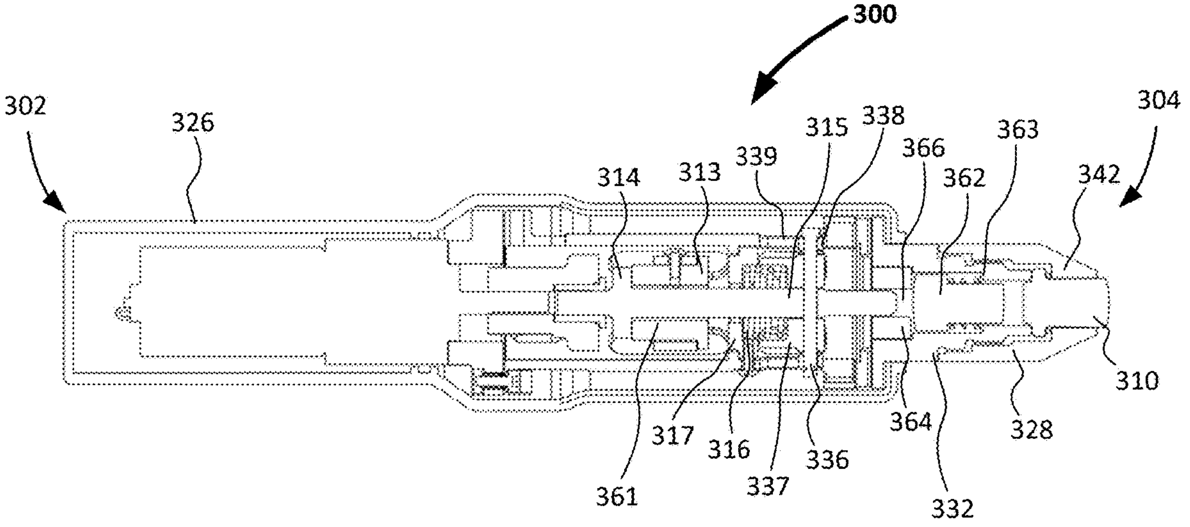
FIG. 3B is a sectional side view of one embodiment of the disclosure incorporating a transfer slug, and a driveshaft in the rearmost position of travel.

Referring now to FIG. 3B which is a section view of the tip and nose cone assembly of an alternative embodiment of the disclosure, the arrangement of the major components may be plainly seen and the operation of the device may be readily understood. In this view, driveshaft 315 is in the fully rearward position, on the toe 360 of helical cam 313. Transfer slug 362 is in the rearwardmost position and transfer slug return spring 363 is in the uncompressed or relaxed state.

The manner of operation of this mechanism is as follows. Still referring to FIG. 3B, compression spring 316 is in its fully compressed state, storing the maximum possible energy as a result of cam follower 314 having progressively compressed compression spring 316 as a result of riding along the inclined face of helical cam 313 to the point of maximum displacement, cam toe 360. At this instant, transfer slug 362 is resting in its rearwardmost position with an air gap 366 between the proximal tip of driveshaft 315 and the distal face of transfer slug 362, as well as an air gap 366 between the proximal face of transfer slug 362 and the distal face of tip 310.

After this point, as cam follower 314 slips off of cam toe 360 and the stored energy of compression spring 316 is instantaneously released, driveshaft 315 is rapidly accelerated longitudinally towards transfer slug 362. There is an ensuing inelastic collision between the proximal tip of driveshaft 315 and the distal face of transfer slug 362 during which the kinetic energy of driveshaft 315 is transferred to transfer slug 362, thereby causing it to rapidly accelerate longitudinally towards the proximal end of device 300.

As transfer slug 362 accelerates longitudinally, it closes air gap 366 and collides inelastically with the distal face of tip 310, thereby transferring its kinetic energy. As tip 310 is constrained against longitudinal motion, the kinetic energy causes tip 310 to vibrate, thereby propagating the acoustic wave energy into any material with which it comes into contact, in this instance preferably the soft tissue or target treatment area of the patient or user.

Figure 4A:
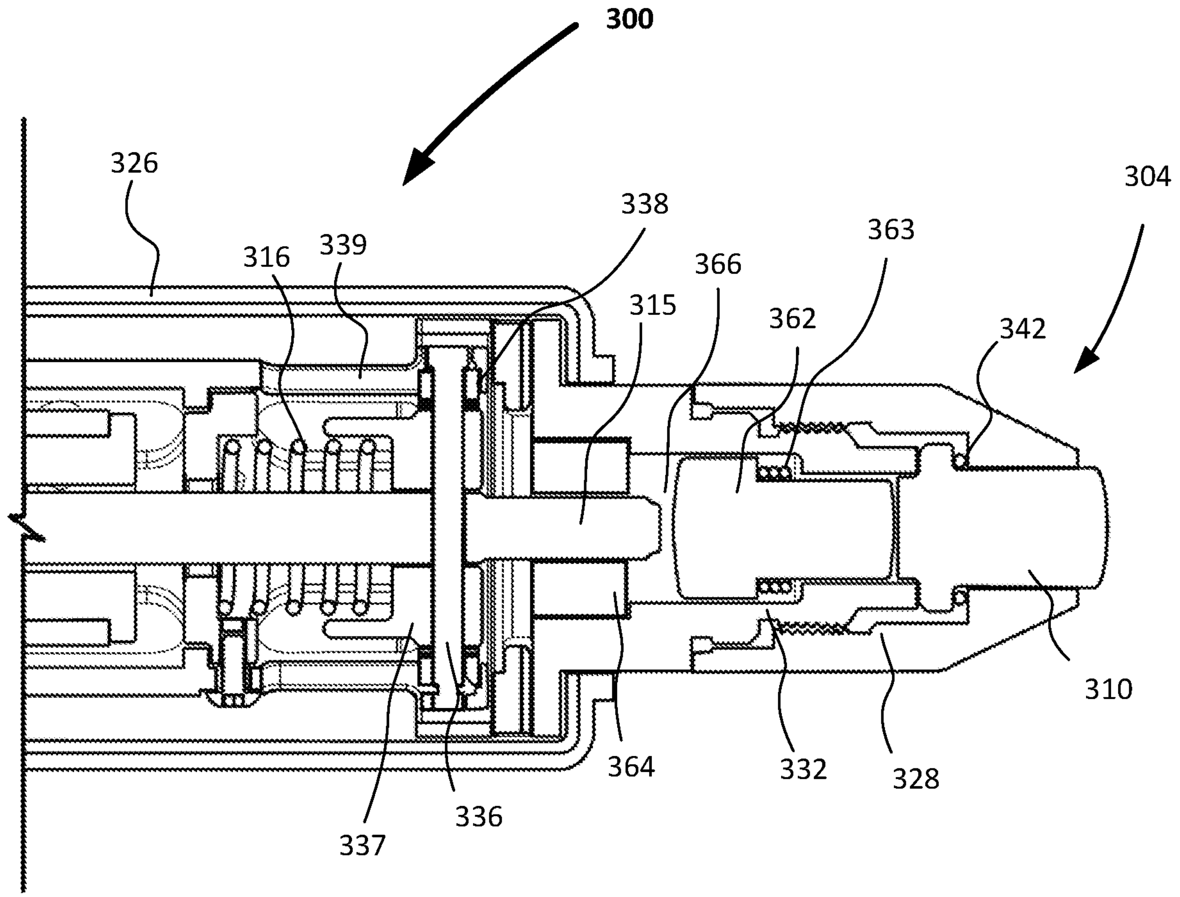
FIG. 4A is a close-up sectional side view of one embodiment of the disclosure incorporating a transfer slug, and a driveshaft in the forwardmost position of travel.

FIG. 4A is a close-up sectional view of this alternate embodiment of the disclosure. It may be seen how transfer slug 362 makes intimate contact with tip 310 when accelerated longitudinally as a result of impact from driveshaft 315, and how said inelastic collision results in the transfer of kinetic energy from the rapidly accelerating transfer slug 362 to captive tip 310, thereby causing it to ring or resonate, and thereby transferring the energy to the target treatment area. In this manner, the reciprocating motion of driveshaft 315 may be accommodated without encumbrance or mechanical interference while no reciprocating motion is communicated to tip 310, thereby creating a purely vibrational acoustic wave energy transfer which is more familiar to users of existing low intensity acoustic or shock wave devices.

Figure 4B:
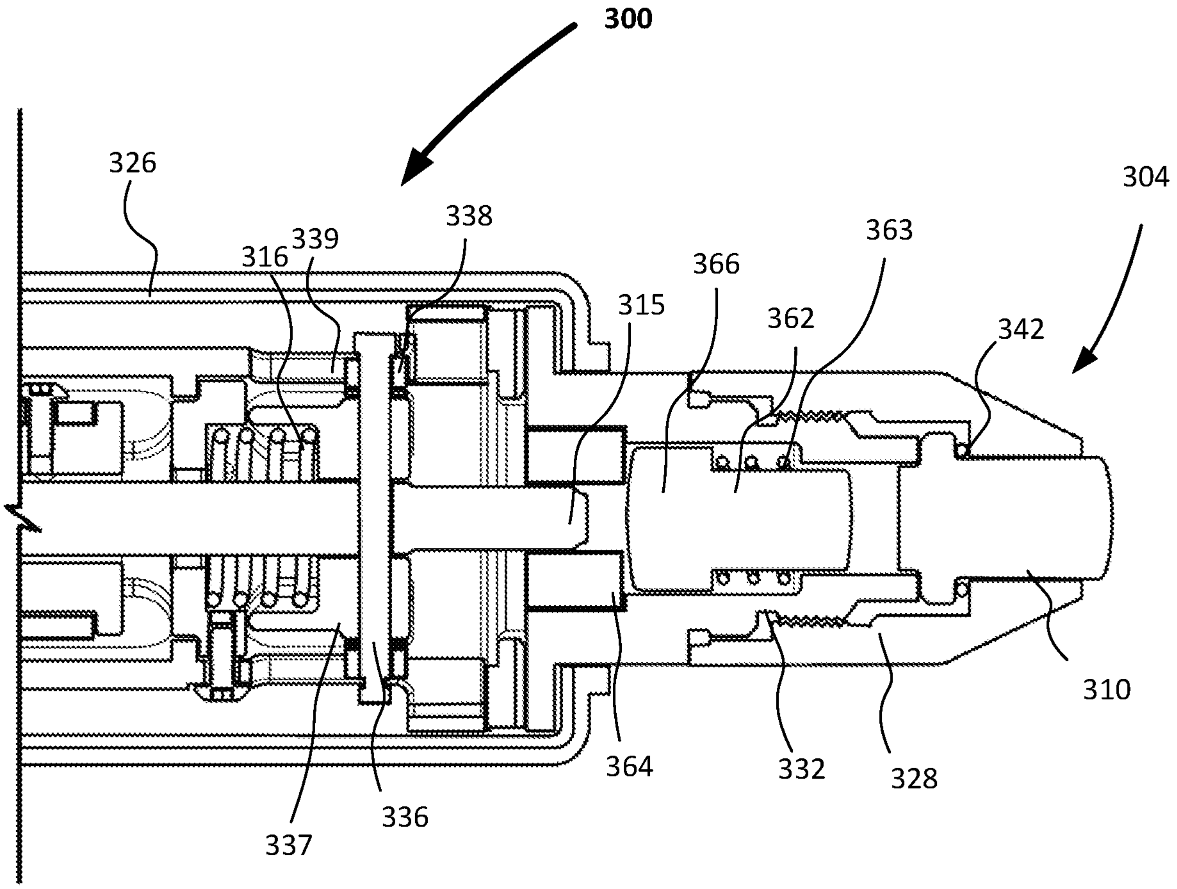
FIG. 4B is a close-up section view of one embodiment of the disclosure incorporating a transfer slug, and a driveshaft in the rearmost position of travel.

Referring now to FIG. 4B, a close-up sectional view of this alternate embodiment of the disclosure is shown. This configuration aims to reduce lost energy (e.g., energy lost through friction) and to provide the maximal transfer of energy from compression spring 316 through driveshaft 315 to transfer slug 362 to tip 310 and ultimately to the target treatment area of the patient. These efforts include linear bushings 364 or in an alternate embodiment, linear bearings, which guide driveshaft 315 in its longitudinal reciprocating motion. The device also includes close tolerance and accurate coaxial bores and outside diameters of transfer housing 332 and transfer slug 362, and even the anti-rotation axle 336 with roller bearings 338, which reside within and travel along guide track 339 to resist the torqueing moment of cam follower 314 as it tracks along the helical cam 313 ramp, thereby affording a low friction, non-binding reciprocating motion of driveshaft 315.

Thus, the present disclosure includes a variety of mechanisms to efficiently transfer energy generated by the device to provide inexpensive electric motor to compress a compression spring, from a decompressing compression spring to the tip of a device which administers low intensity acoustic or shock waves to targeted areas of the user's body for treatment of soft tissue damage, cellulite reduction, or erectile dysfunction which is a safe, inexpensive, reliable, robust, and which would be optimal for the application.

While the foregoing written description of the disclosure enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the invention as claimed.

The invention claimed is:

1. A treatment device comprising:
- a housing having a longitudinal axis extending between a proximal end and a distal end;
- a motor disposed within the housing adjacent the proximal end and having a rotatable motor output shaft;
- a driveshaft operatively coupled to the motor, the driveshaft having a cam follower;
- a cam spaced away from the motor output shaft and operatively coupled thereto via a coupler, the coupler being rigidly coupled to the motor output shaft adjacent the proximal end and extending distally thereof and being at least partially disposed about the cam, the coupler extending over the cam follower and terminating distal to the cam follower, the cam follower being movable relative to the coupler;
- a striking element operatively driven by the motor; and
- a tip disposed adjacent the distal end.

2. The treatment device of claim 1, further comprising:
- a compression spring at least partially disposed about the driveshaft; and
- wherein the cam is disposed adjacent the compression spring, the cam having a first flat end and a second end having at least one discontinuity.

3. The treatment device of claim 2, wherein the striking element is the driveshaft.

4. The treatment device of claim 2, wherein the driveshaft actuates the striking element.

5. The treatment device of claim 1, further comprising a return spring at least partially disposed about the tip.

6. The treatment device of claim 1, further comprising a return spring.

7. The treatment device of claim 1, further comprising an annular ring coupled to the tip.

8. The treatment device of claim 1, further comprising an annular ring integrally formed with the tip.

9. The treatment device of claim 8, further comprising a return spring seated about the tip and abutting the annular ring.

10. The treatment device of claim 9, further comprising a variable air gap disposed between the tip and the striking element, the variable air gap having a length along the longitudinal axis that at least partially depends on whether the return spring is compressed.

11. The treatment device of claim 1, further comprising a nose cone disposed about at least a portion of the tip, the tip being moveable within the nose cone along the longitudinal axis.

12. A treatment device comprising:
- a housing having a longitudinal axis extending between a proximal end and a distal end;
- a motor disposed within the housing, the motor having a rotatable motor output shaft;
- a driveshaft operatively coupled to the motor, the driveshaft having a cam follower orthogonally extending from the driveshaft;
- a cam spaced away from the motor output shaft and operatively coupled thereto via a coupler, the coupler being at least partially disposed about the cam and extending over the cam follower, the cam follower being movable relative to the coupler;
- a striking element disposed within the housing and operatively driven by the motor output shaft to move along the longitudinal axis; and
- a tip disposed adjacent the distal end.

13. The treatment device of claim 12, wherein the coupler covers but does not contact the cam follower.

14. The treatment device of claim 12, further comprising a nose cone disposed about at least a portion of the tip, the tip being moveable within the nose cone along the longitudinal axis.

* * * * *